(12) United States Patent
Gurkaynak et al.

(10) Patent No.: US 11,867,412 B2
(45) Date of Patent: Jan. 9, 2024

(54) DEVICE AND METHOD FOR CONVERTING SOLAR PV ENERGY INTO THERMAL ENERGY STORAGE USING COMBINED HEAT-PUMP AND RESISTIVE HEATING ELEMENTS IN WATER HEATER

(71) Applicant: PREMIER ENERGY HOLDINGS, INC., Frederick, CO (US)

(72) Inventors: Yusuf Gurkaynak, Arvada, CO (US); Nikola Milivojevic, Boulder, CO (US); Keegan Landreth, Longmont, CO (US); Michael Dean Steingrebe, Longmont, CO (US)

(73) Assignee: PREMIER ENERGY HOLDINGS, INC., Frederick, CO (US)

( * ) Notice: Subject to any disclaimer, the term of this patent is extended or adjusted under 35 U.S.C. 154(b) by 7 days.

(21) Appl. No.: 17/559,898

(22) Filed: Dec. 22, 2021

(65) Prior Publication Data

US 2022/0196251 A1 Jun. 23, 2022

Related U.S. Application Data

(60) Provisional application No. 63/129,444, filed on Dec. 22, 2020.

(51) Int. Cl.
*F24D 19/10* (2006.01)
*F24D 12/02* (2006.01)
(Continued)

(52) U.S. Cl.
CPC ...... *F24D 19/1045* (2013.01); *F24D 11/0221* (2013.01); *F24D 11/0228* (2013.01);
(Continued)

(58) Field of Classification Search
CPC .. F24D 11/0221; F24D 11/0228; F24D 12/02; F24D 19/1045; F24H 4/04;
(Continued)

(56) References Cited

U.S. PATENT DOCUMENTS 8,373,303 B1 * 2/2013 Daniels ................... H02M 7/44
307/82
8,909,033 B2 * 12/2014 Kreutzman ........... F24H 15/174
392/458
(Continued)

FOREIGN PATENT DOCUMENTS

CN 102959820 * 3/2013
DE 102012112962 * 6/2014
(Continued)

OTHER PUBLICATIONS

KR20160065977 (Year: 2023).*
(Continued)

*Primary Examiner* — Nathaniel E Wiehe
*Assistant Examiner* — Frederick F Calvetti
(74) *Attorney, Agent, or Firm* — COZEN O'CONNOR (57) ABSTRACT

Photovoltaics and an MPPT DC/DC converter powers a DC bus of a controller. It uses an electric heat pump to heat a mass like water, and also has a resistive heating element to heat the mass. A microcontroller controls a variable frequency (VFD) motor drive to power the electric heat pump when sufficient solar power is available to run the heat pump and uses the resistive element to heat the thermal mass when insufficient solar power exists for the heat pump or when excess solar power is available. A controller has an MPPT input for solar power and a VFD to provide power through an output to a heat pump-based water heater and an output to power a resistive water heating element. A microcontroller determines solar power available and runs the heat
(Continued)

pump when possible and the resistive element when insufficient power is available or when excess power is available.

21 Claims, 7 Drawing Sheets

(51) Int. Cl.
*F24D 11/02* (2006.01)
*H02S 40/30* (2014.01)
*F24H 4/04* (2006.01)
*H02P 27/08* (2006.01)

(52) U.S. Cl.
CPC .............. *F24D 12/02* (2013.01); *F24H 4/04* (2013.01); *H02P 27/08* (2013.01); *H02S 40/30* (2014.12)

(58) Field of Classification Search
CPC ...... H02P 2201/11; H02P 25/04; H02P 27/08; H02S 40/30; Y02E 10/50
USPC ........................................................ 392/341
See application file for complete search history.

(56) References Cited

U.S. PATENT DOCUMENTS

| | | | | |
|---|---|---|---|---|
| 9,002,185 B2* | 4/2015 | Kreutzman | ............. | F24H 15/36 |
| | | | | 392/447 |
| 10,334,664 B2* | 6/2019 | Wiszniewski | ....... | H05B 1/0244 |
| 10,571,135 B2* | 2/2020 | Kreutzman | ......... | F24D 17/0021 |
| 11,041,640 B2* | 6/2021 | Stepa | .................... | F24H 15/407 |
| 11,268,706 B2* | 3/2022 | Colon | ................. | F24D 17/0021 |
| 11,371,722 B2* | 6/2022 | Yabe | ........................ | F24D 18/00 |
| 2013/0043723 A1* | 2/2013 | Daniels | ................... | H02J 3/381 |
| | | | | 363/95 |
| 2015/0054443 A1* | 2/2015 | Swamy | .................... | H02P 23/06 |
| | | | | 318/504 |
| 2017/0211862 A1* | 7/2017 | Slack | ....................... | F25B 49/02 |
| 2017/0358927 A1* | 12/2017 | Saussele | ................... | H02J 7/35 |
| 2018/0266701 A1* | 9/2018 | Sofer | .................. | F24D 19/1057 |
| 2019/0195513 A1* | 6/2019 | Colon | ................. | F24D 11/0221 |
| 2020/0333045 A1* | 10/2020 | Kernich | .................... | F24H 9/45 |
| 2020/0393154 A1* | 12/2020 | Marengo | .................. | F24F 11/88 |
| 2022/0170648 A1* | 6/2022 | Hodges | ............... | F24D 19/1057 |
| 2022/0224276 A1* | 7/2022 | Lee | ........................ | H02P 29/028 |
| 2022/0235970 A1* | 7/2022 | Williams | .................. | F24H 4/04 |

FOREIGN PATENT DOCUMENTS

| | | | |
|---|---|---|---|
| DE | 102012112962 A1 | | 6/2014 |
| EP | 3404334 | * | 11/2018 |
| EP | 3404334 A1 | | 11/2018 |
| WO | WO2011145034 | * | 11/2011 |
| WO | WO2017066307 | * | 4/2017 |
| WO | WO2019068132 | * | 4/2019 |
| WO | WO2019/193316 | * | 10/2019 |
| WO | WO 2019/193316 A1 | | 10/2019 |
| WO | WO2020212859 | * | 10/2020 |

OTHER PUBLICATIONS

WO2015056721 (Year: 2023).*
International Patent Application No. PCT/US2021/064962 International Search Report and Written Opinion dated Mar. 16, 2022, 8 pages.

* cited by examiner

DEVICE AND METHOD FOR CONVERTING SOLAR PV ENERGY INTO THERMAL ENERGY STORAGE USING COMBINED HEAT-PUMP AND RESISTIVE HEATING ELEMENTS IN WATER HEATER

RELATED APPLICATIONS

The present document claims priority to U.S. provisional patent application 63/129,444 filed 22 Dec. 2020, the entire content of which is incorporated herein by reference.

BACKGROUND

Electric water heaters are third on the list, after air conditioning and ventilation, and water pumps, when it comes to the electric energy consumption for residences. Traditional electric water heaters are based on a resistive element that converts electric energy into the heat; alternative hot water sources include gas and "wet" solar panels.

Gas water heating is limited to locations where gas supplies exist, and in some communities have been banned for environmental reasons. "Wet" solar hot water systems are often used in warm climates but require very different panel types and array layouts than those used for photovoltaic power systems.

In the past decade, a novel electrical water heater is introduced, based on heat pump technology. The heat pump principle is well known and is mainly used for air conditioning and refrigeration systems, where heat is a nuisance product of the process and is rejected into the environment. Reversible heat pump systems have also been used to heat buildings during winter and cool them in summer in some areas.

In heat-pump water heaters, heat pumps transfer thermal energy from the environment into water, while cold air is rejected into the ambient. Heat pump-based water heaters can use only a fraction of electrical energy (20% or less) than resistive electric heaters to heat the same amount of water to a given temperature. Heat pump-based water heaters are becoming very popular on the East coast of the US, where utilities subsidize this technology to postpone big investment in upgrading outdated electric grid infrastructure.

SUMMARY

A system uses photovoltaics and an MPPT DC/DC converter to power a DC bus. It uses an electric heat pump to heat a thermal mass such as water, and also has a resistive heating element coupled to heat the thermal mass. A microcontroller controls a variable frequency (VFD) motor drive to power the electric heat pump when sufficient solar power is available to run the electric heat pump and uses the resistive element connected to heat the thermal mass when insufficient solar power exists to run the heat pump or when excess solar power is available.

A controller has an MPPT input adapted to receive solar power and a VFD to provide power through a first output to a heat pump-based water heater and an output to power a resistive water heating element. A microcontroller determines solar power available and runs the heat pump when sufficient power is available and the resistive element when insufficient power is available for the heat pump or when excess power is available.

DETAILED DESCRIPTION OF THE EMBODIMENTS

A proposed solar driven heat pump water heater (FIG. 1B) has an electric controller that harvests solar photovoltaic power and converts it into the hot water using a heat pump as a load. The electronic controller can have solar photovoltaic as the only input, in which case it balances an input power with output heat pump power by utilizing variable frequency/voltage on its outputs. In an embodiment, it also has an additional electric resistive heating element. The controller uses this resistive element when there is not enough solar power to run the heat pump, or when there is an excess solar power and the heat pump power is already at its maximum.

When the resistive heating element is used without the heat pump because there is not enough solar power to run the heat pump off solar, the controller measures the power applied to the heating element, so whenever solar power is higher than the threshold power required to start the heat pump, the controller starts the heat pump and shuts down the power to the resistive heating element. The reason for that is that heat pump much more efficiently converts solar PV energy into thermal energy in means of heating the water.

Furthermore, even if the controller is connected to the AC grid source, solar energy can be used to offset the AC grid energy for thermal storage (water heating) applications. In this case AC grid power is used to start the heat pump even if the available solar power is not enough, and thermal element is used only when there is an excess of solar power and heat pump is already running at maximum power from solar only.

In some embodiments connected to the AC grid, when the water reaches a maximum water temperature, excess solar electrical power may be provided through a grid-tie inverter to the AC grid.

Figure 1A:
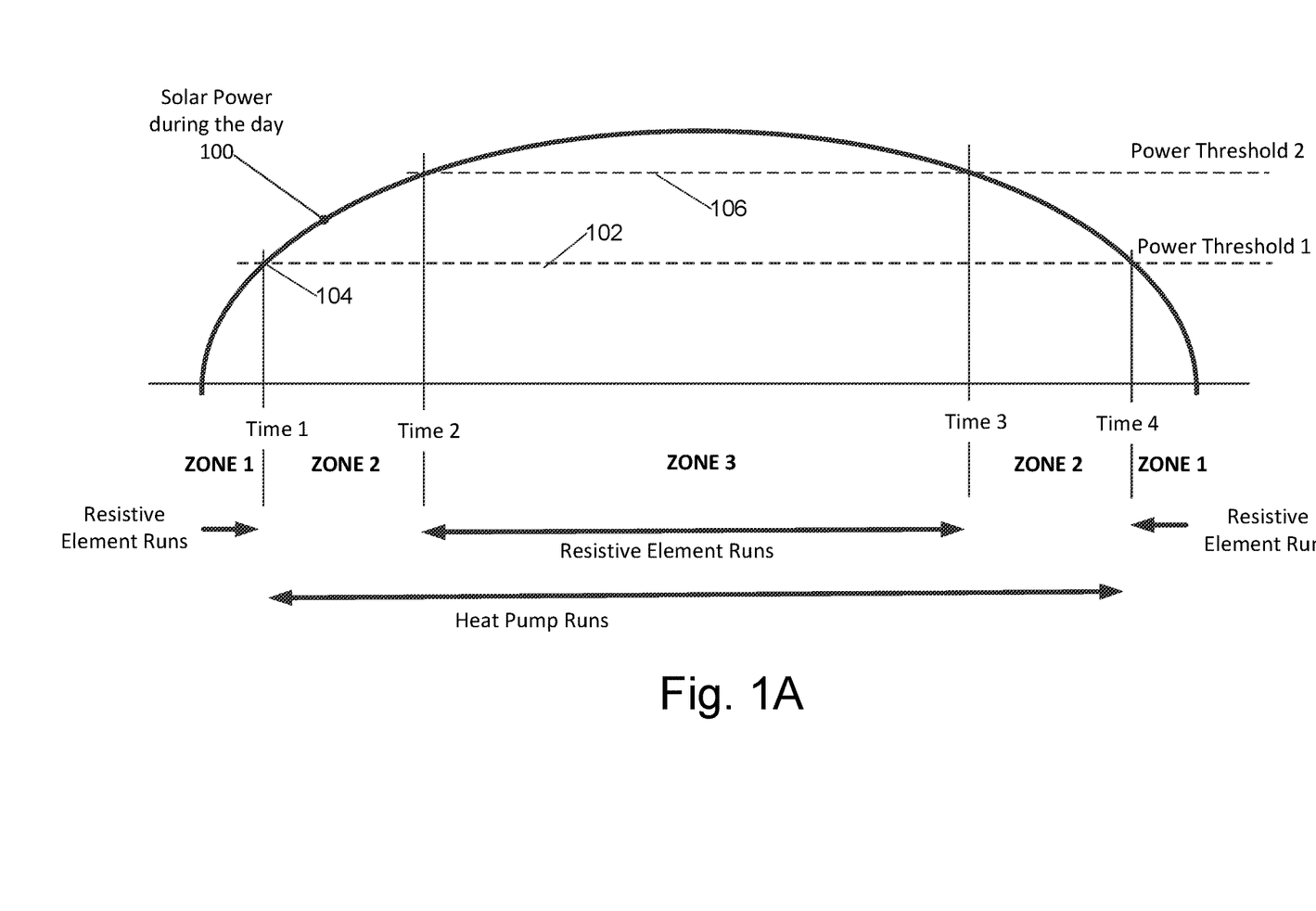
FIG. 1A is a graph illustrating available daily solar power for a sunny day, showing power-availability zones when the resistive and heat pump heating systems operate.
Figure 1B:
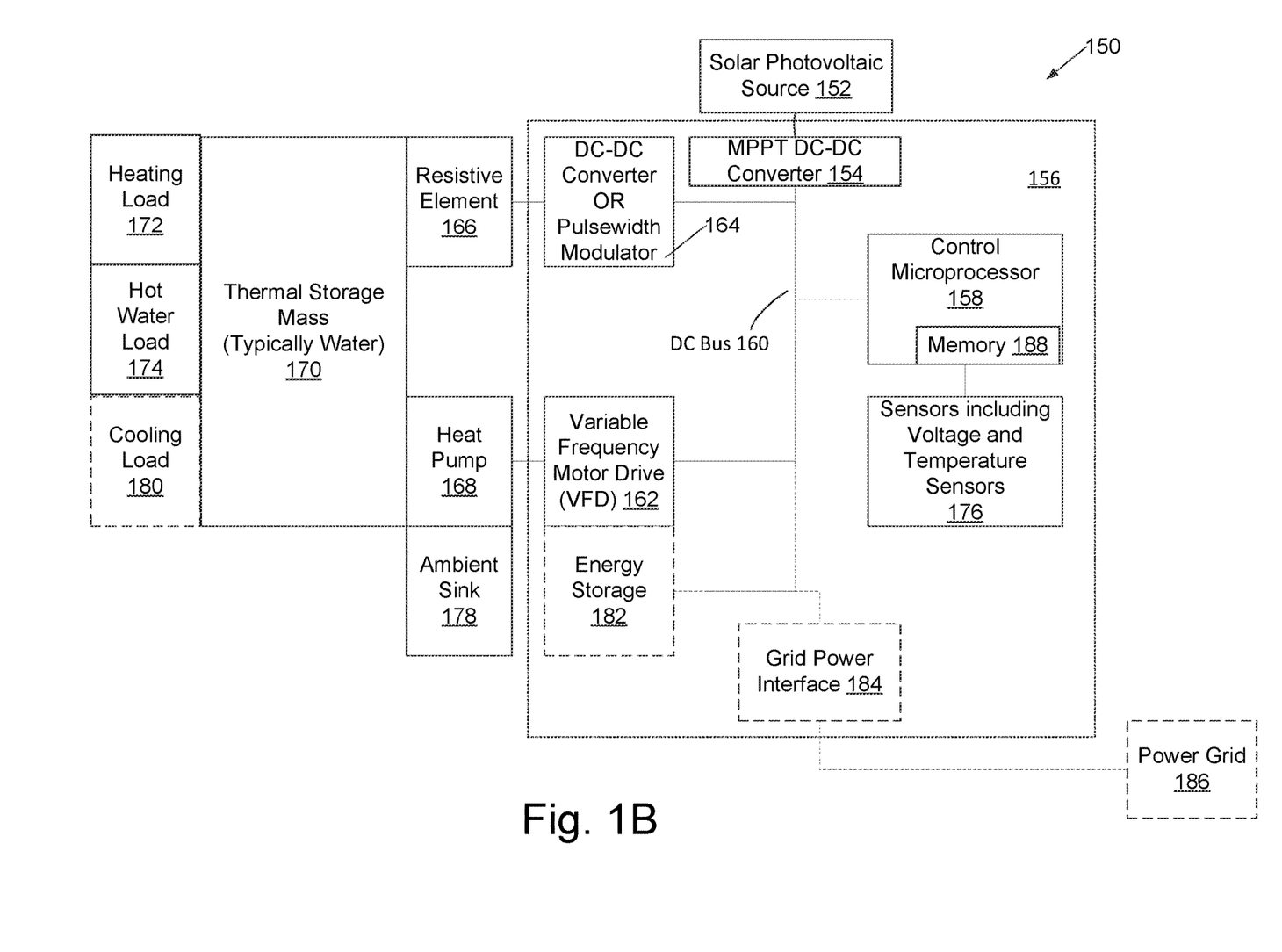
FIG. 1B is a block diagram of a system for heating water and/or heating or cooling a building making use of solar photovoltaics, a heat pump, and a resistive heating element.

Available daily solar power for one 24-hour day is shown by curve 100 in FIG. 1A. In early morning in ZONE 1, before sufficient power is available to run a heat pump, available solar power is used for powering a resistive heating element that heats water. This continues until Time 1 104 when solar power availability reaches Power Threshold 1 102. Power Threshold 1 is the minimum power at which the heat pump can operate.

Once solar power reaches Power Threshold 1 102, then the controller turns OFF the resistive heating element and starts the heat pump, which runs throughout ZONES 2 and 3. Since heat pump motors may absorb less power at frequencies lower such as 75% of full rated frequency, than they absorb at full rated frequency, the controller varies frequency between 75% and 100% of full rated frequency, and may vary voltage, of VFD 162 to match power used by the heat pump to available solar power. During the mid-day, when available solar power is higher than a maximum power 106 that can be absorbed by the heat pump (Power Threshold 2), the controller turns on resistive heating element again, to utilize excess solar power, throughout ZONE 3 where available solar power exceeds maximum heat pump power 106. Through ZONE 3 the water is heated by both the heat pump and resistive element.

As available power decreases below the maximum power 106 usable by the heat pump, power threshold 2, such as in the afternoon or upon clouds shading panels, the system turns off the resistive heating element to conserve power for the heat pump, and when available power drops below the minimum power required to run the heat pump (power threshold 1) the system re-enables the resistive heating element until there is no solar power available, and the system shuts down.

In summary, resistive heating element only is used in ZONE 1, heat pump is used in ZONE 2, while both heat pump and resistive heating element are used in ZONE 3. Solar insolation dictates the solar available power, which dictates which zone the system is at any given time of the day.

A system 150 (FIG. 1B) according to an embodiment is configured to perform the method discussed above with reference to FIG. 1A while making maximum possible use of available photovoltaic power for heating water. It has a photovoltaic power source 152 coupled to feed a DC-DC converter 154 of a controller 156, the DC-DC converter being coupled to power a DC power bus 160 and being configured to perform maximum power point tracking (MPPT) by a control microprocessor 158.

DC power bus 160 is coupled to power a variable frequency motor drive (VFD) 162 and a resistive element control device 164 that may be a DC-DC converter or a pulse width modulator (PWM), the resistive element control device 164 and VFD 162 both being controlled by the control microprocessor 158. The resistive element control device 164 of the controller is coupled to drive a resistive heating element 166 arranged to heat thermal storage mass 170, thermal storage mass 170 is typically water. Similarly, the VFD 162 is arranged to power an electric motor (not shown) of a heat pump 168 arranged to heat the same thermal mass 170. Thermal mass 170 may heat a heating load, such as a building, by being water directly piped to radiators to heat the heating load, or in an alternative embodiment is air-heated concrete or rocks through which air is blown to heat the heating load. Thermal mass 170 may also provide domestic hot water to hot water loads 174 such as bathtubs, washing machines, dishwashers, sinks, and showers.

Control microprocessor 158 of system 150 has sensors 176 to determine temperature of thermal storage mass 170, time of day, available power from photovoltaic power source, voltage of DC power bus 160, heat-pump electric motor rotation, and other parameters of interest to performing the methods described herein.

Heat pump 168 transfers heat between thermal mass 170 and an ambient heat sink 178, which in embodiments may be ambient air, pipes buried to transfer heat from the ground, or through a heat-exchanger and blower into air. In some particular embodiments, heat pump 168 is reversible to it could cool thermal mass 170 instead of heating thermal mass 170, so thermal mass 170 of these particular embodiments can also serve to run a cooling load 180.

The electric motor of heat pump 168 is, in most embodiments, an AC electric motor that can absorb far higher power when it starts rotation (a starting surge) than when the AC electric motor is already running (run-time power). To accommodate starting surges, controller 156 may have an energy storage 182, such as ultracapacitors or a battery, or a line interface 184, so that power from a power grid 186 may be used to start motor rotation of heat pump 168.

A memory 188 of control microprocessor 158 has firmware to control operation of the system. Control microprocessor 158 may also be referred to as a microcontroller.

In an embodiment, a controller 208 (FIG. 2) of system 200 receives power from one or more solar photovoltaic (PV) panels 202 and is adapted to provide power to the heat pump-based water heater 204 and to resistive heating element 206. Both heat pump-based water heater and the resistive heating element are part of a same water heater tank system. The controller has a DC-DC converter 210 that, in conjunction with microcontroller 220, performs maximum power point tracking (MPPT) to extract the most power from solar PV system onto DC link or DC bus 211, and a three phase variable frequency drive (VFD) circuit 212, where a single phase heat pump is connected through output noise filters 213 across two phases 214, 216, and resistive heating element 206 is connected across a third phase 218 of the VFD and DC−. A microcontroller 220 controls operation of DC-DC converter 210 and all phases 214, 216, 218 of the VFD, thereby controlling alternating current (AC) frequency and voltage on phases 214, 216 that drive an electric motor of heat pump water heater 204. In this embodiment, the third phase 218 of the VFD operates as a pulsewidth modulator to serve as a resistive power control apparatus.

Switching devices Q1, Q2, Q3, Q4, Q5, and Q6 of VFD 212 (FIGS. 2-5), 404 (FIG. 6) may be any suitable high-voltage, high-power, electronic switching device, such as but not limited to N and P channel field effect transistors or bipolar transistors, capable of switching reasonably quickly to switch power from high (DC+) and low (DC−) voltage busses onto AC outputs Ph1, Ph2, Ph3 of the VFDs while avoiding excessive power dissipation due to slow switching times.

Figure 2:
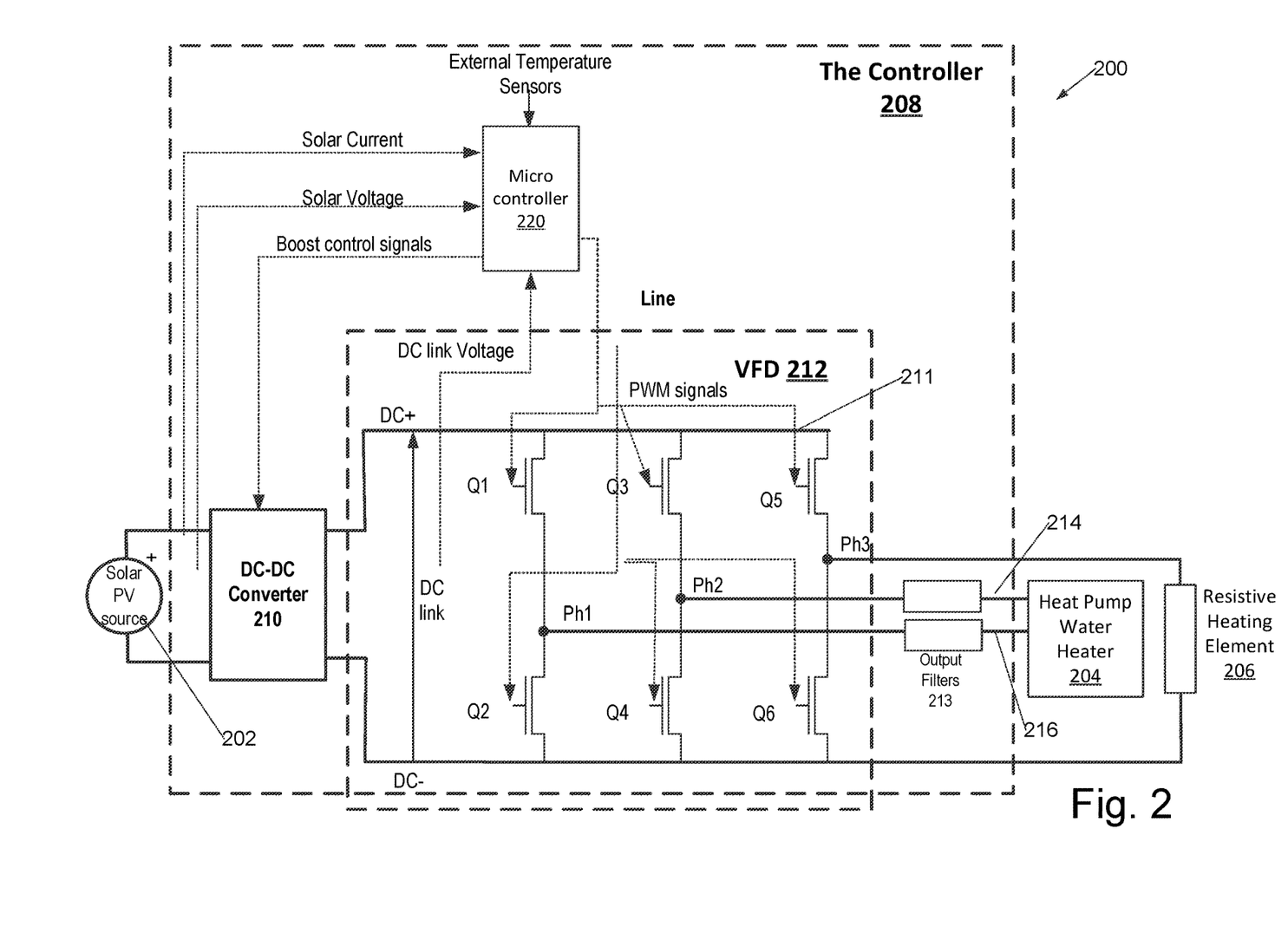
FIG. 2 is a block diagram of a controller connected to the one or more solar photovoltaic (PV) panels as an input, and heat pump-based water heater and resistive heating element on its output.
Figure 3:
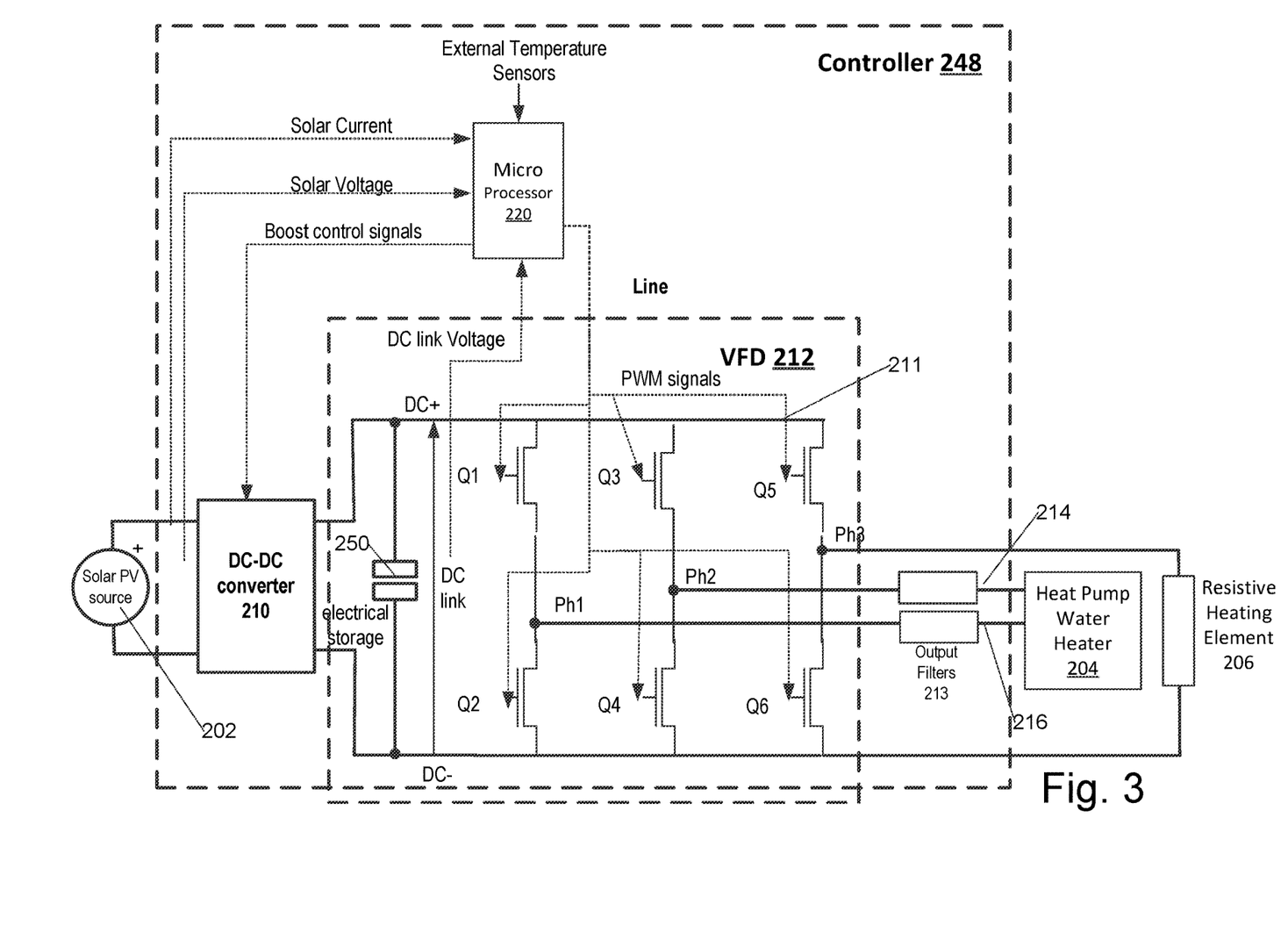
FIG. 3 is a block diagram of an embodiment similar to that of FIG. 2 but with added electrical storage for overcoming starting surge requirements of a heat pump system and thereby allowing the heat pump motor to start; the storage is added in the DC link circuit either in the form of battery or as ultracapacitors.

FIG. 3 illustrates an embodiment similar to that of FIG. 2 but with an electrical storage for starting a heat pump system in controller 248; the storage is added in the DC link circuit either as a battery and bidirectional DC-DC converter, or as ultracapacitors 250. Components with the same callout number in FIG. 3 as in FIG. 2 have similar function to those of FIG. 2.

Figure 4:
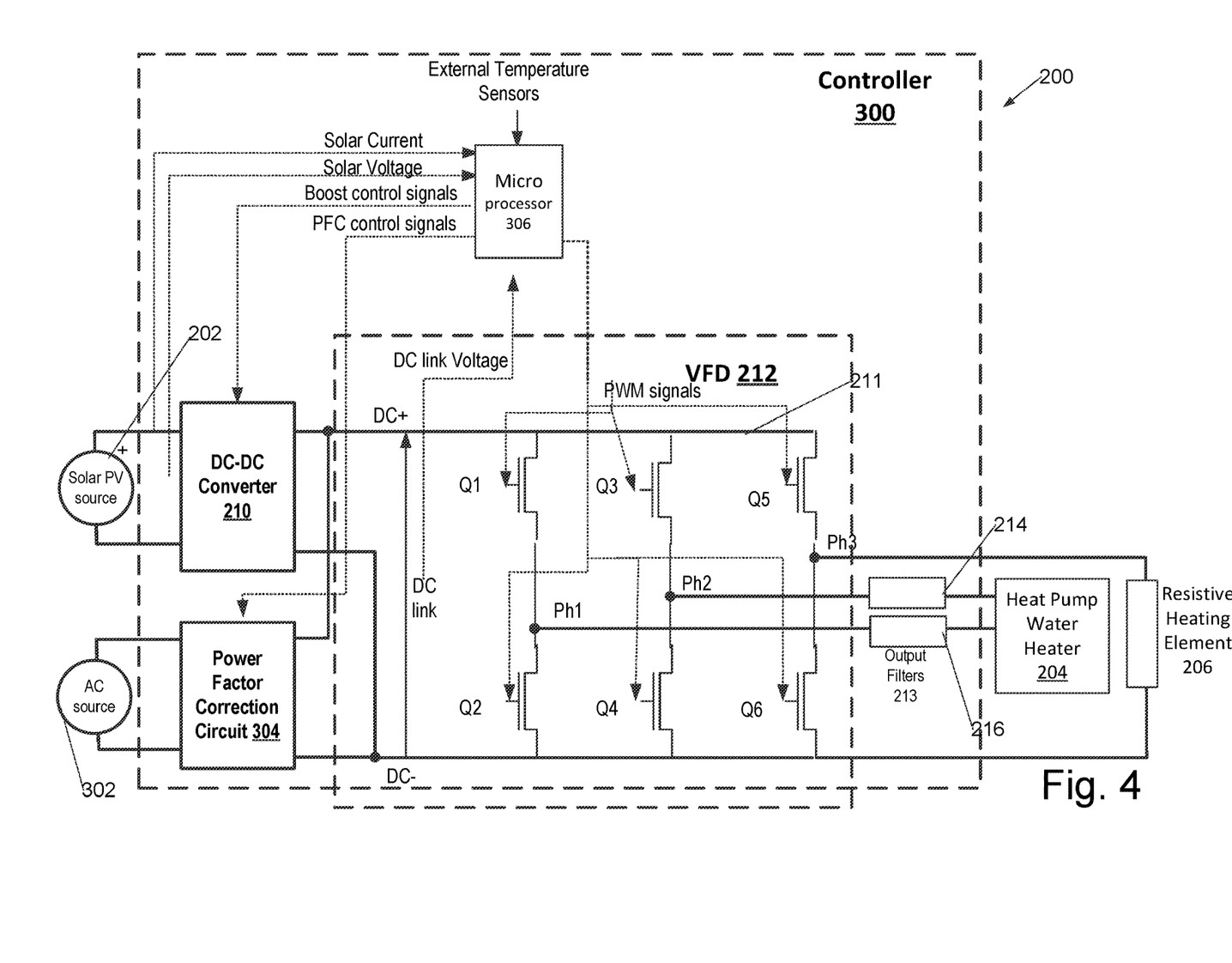
FIG. 4 is a block diagram of a setup resembling that of FIG. 2, but with an additional AC grid power source input.

FIG. 4 illustrates another embodiment 300 resembling that of FIG. 2, but with an additional AC power source 302 input. The controller includes a power factor correction (PFC) circuit 304, which converts AC source power into DC under control of microprocessor 306 and combines it with solar PV (also DC in nature) power to supply VFD circuit. In this setup, the microprocessor 306 is configured to use as much solar PV power as possible, offsetting AC grid power, and to use AC grid power mainly for overcoming starting surges of the electric motor of the heat pump that typically has significant starting surge power requirements. Microprocessor 306 may, in some cases when lack of available solar power for several days has led to water getting rather chilly and below a temperature threshold in the heat pump water heater, use AC grid power brought in through PFC circuit 304 to run the heat pump water heater 204. Microprocessor 306 also performs the functions of microcontroller 220 to control frequency and voltage provided by the VFD to heat pump electric motor of heat pump 204 and to resistive heating element 206. Components of FIG. 4 with the same callout number as in FIG. 2 have similar function to those of FIG. 2.

Figure 5:
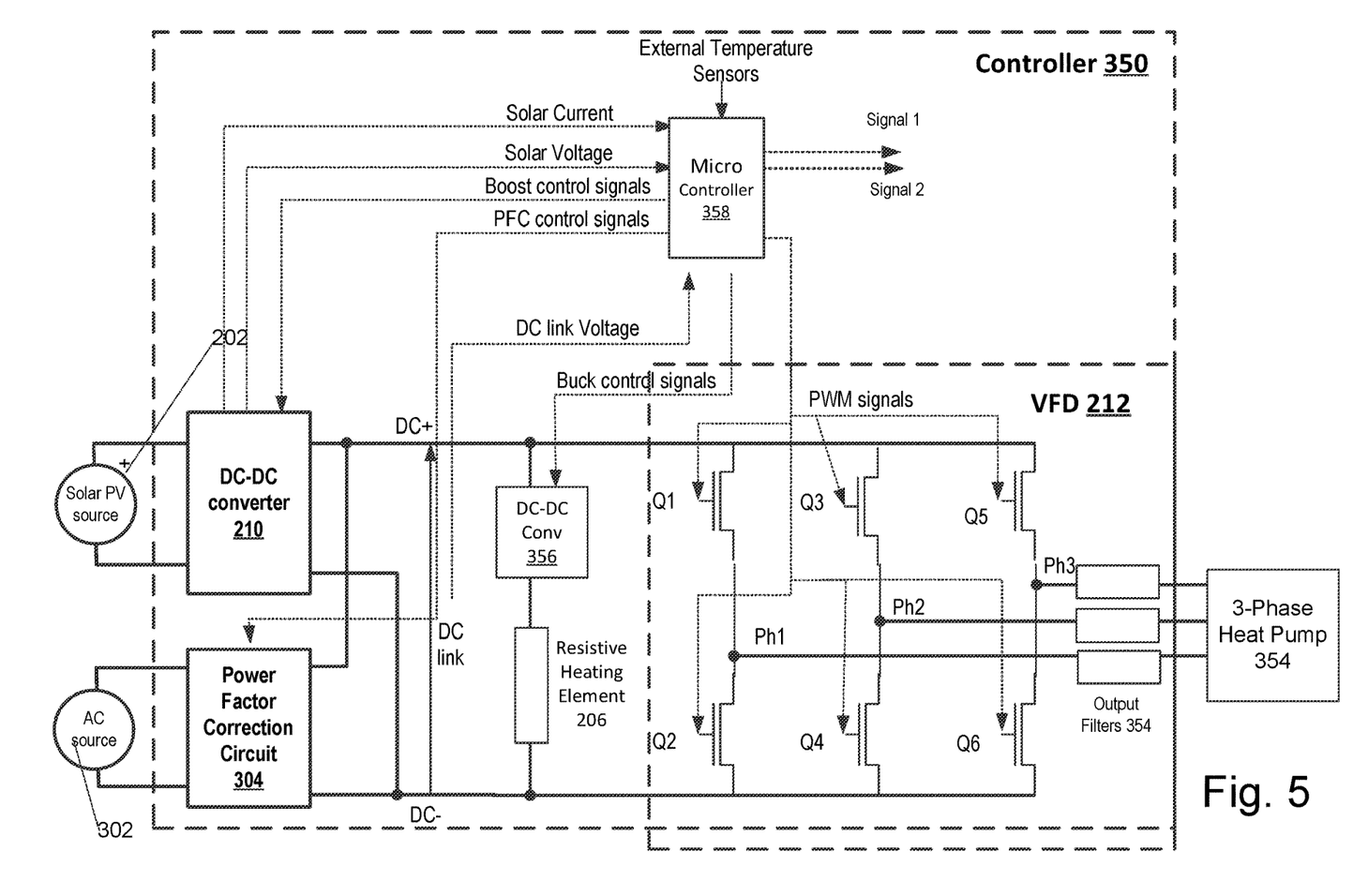
FIG. 5 is a block diagram of a setup resembling that of FIG. 3, but with a three-phase heat pump, and there are three phase filters between the controller and the three-phase heat pump that convert pulse-width modulated (PWM) power signals into sinewave power.

FIG. 5 illustrates another embodiment 350 resembling the embodiment of FIG. 3, but heat pump 352 is a three-phase load using an AC three-phase motor, and there are three phase filters 354 between the controller and the three-phase heat pump that convert PWM power signal into smoother sinewave. Additionally, the resistive heating element is controlled via DC-DC power converter 356 circuit, which in an embodiment may be a buck converter.

Figure 6:
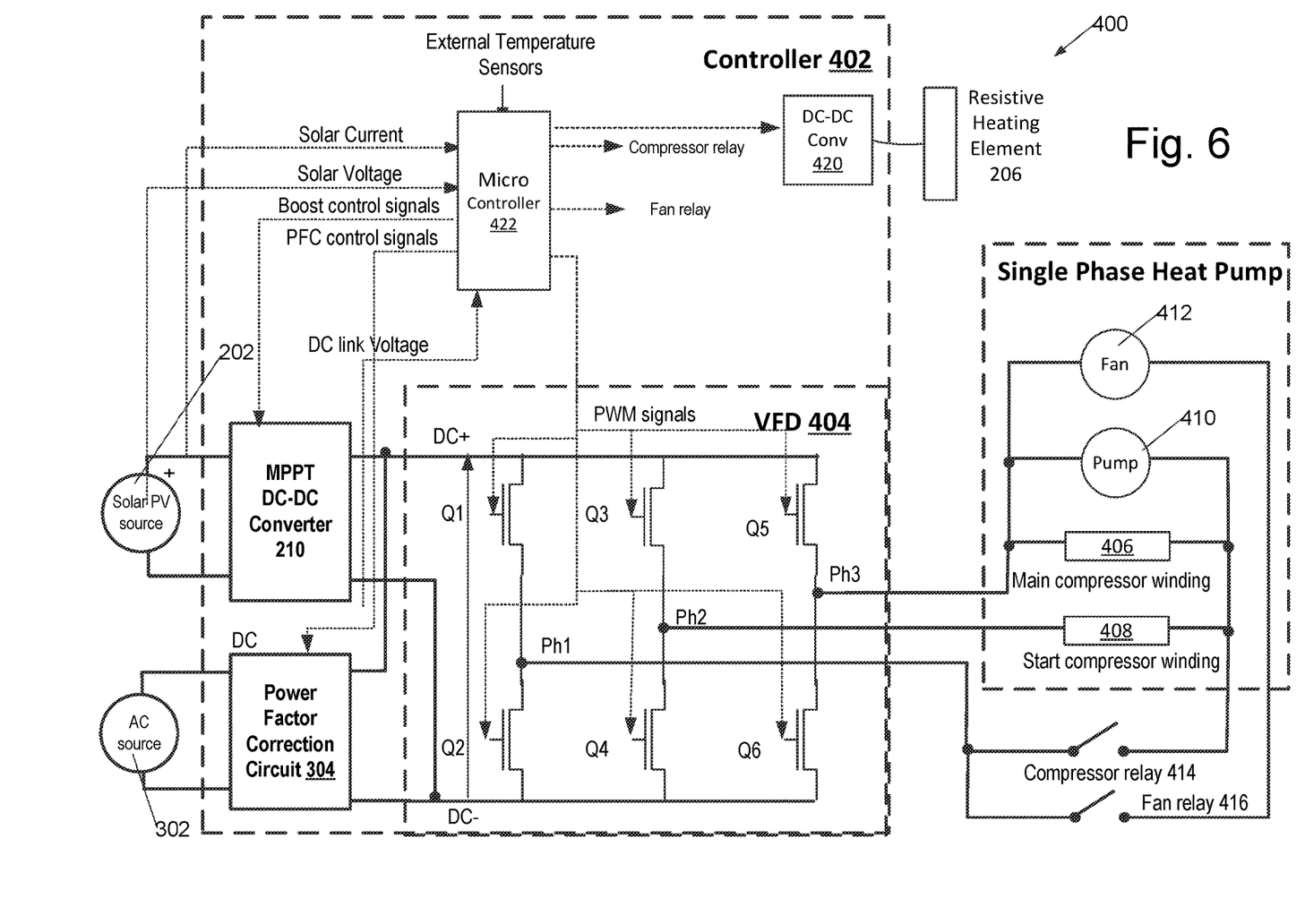
FIG. 6 is a block diagram of a single-phase heat pump setup with its components separately wired and controlled by the controller.

FIG. 6 illustrates another embodiment 400 incorporating single phase heat pump setup with its components shown separately wired to, and controlled by, the controller 402. A water pump is connected in parallel with the heat-pump compressor AC electric motor's main winding 406, wired across VFD 404 phases 1 and 3, while the heat pump compressor motor's starting winding 408 is wired across VFD 404 phases 1 and 2. Also, power for both the compressor motor 406, 408 and water pump 410 can be cut off using a compressor relay. The heat pump fan 412 is connected to the VFD phases 1 and 3 via a fan relay 416. The system has a resistive heating element 206 controlled via DC-DC power converter circuit 420 that in a particular embodiment is a buck converter, but can also be used without resistive element 206, as a standalone heat pump water heater only. The MPPT DC-DC converter 210, resistive power control DC-DC converter 420, VFD 404, PFC circuit 304, and other components are all controlled by microprocessor 422 operating under control of firmware in an associated memory (not shown).

There is a good way to add a solar PV energy to operate heat pump-based water heaters, which is presented herein. We describe a way to use entire solar PV energy and convert it into hot water using either heat pump and a resistive element to fully utilize available solar PV power, operating the heat pump when sufficient solar power is available, the resistive element when insufficient solar power is available for the heat pump, or both simultaneously.

Heat pump-based water heater heats up same amount of water five times faster than an electric resistive heating element when using a same amount of electrical power. Thus, heat pump-based water heater is device of choice for creating hot water.

A heat pump water heater includes several different components: compressor, fan, water pump and an electronic board that receives the information about water temperature and controls turning these components on and off, based on the water temperature reading, to keep the water within a predetermined water temperature range.

The downside of operating heat pump is that it has huge start-up current/power draw, which can be 5-10 times the nominal rating during regular operation of the unit. In other words, if it takes 5 A to run the heat pump, it might take 25-50 A to start its operation from the standstill.

The reason for this is because compressor must start against the pressure, where electrically developed torque on the electrical machine must overcome mechanical starting torque to start the compressor. Fan and water pumps present much smaller power loads compared with compressor, which is usually 80-90% of the total nominal heat pump water heater power.

A key challenge of running a heat pump-based water heater using solar PV is in starting the heat pump, as solar PV system has limited power, which is dynamically changing during the daytime based on solar insolation and weather.

Conventional residential heat pump water heaters are AC loads, usually being connected to a single phase 120/230Vac grid outlet. Thus, to run a heat pump on solar power, there must be a power electronics device to convert DC power from solar PV into AC power for the heat pump.

Furthermore, voltage and current of solar PV varies during the day based on actual solar insolation, hence the need for additional DC/DC converter (boost circuit is a good candidate) to regulate DC voltage that powers DC/AC converter (inverter or VFD), which creates AC power for the heat pump.

Ultimately, the combination of DC/DC and subsequent DC/AC converter must operate such that DC/DC converter interfaces solar PV system, with a role of extracting maximum power from it, based on a maximum power point (MPPT) algorithm.

Because solar PV power varies during the daytime, the DC/AC converter must have an ability to vary voltage and frequency (operate as variable frequency drive—VFD), to enable variable load power, so that power balance between DC/DC and DC/AC converter matches and maintain the power balance at all times for any given power output of the solar PV system.

Thus, there is a need to know the operating envelope of heat pump-based water heater, as not all components (compressor, water pump, fan, control board, etc.) are susceptible to the same voltage/frequency variation. There is a limited operating window where varying voltage and frequency in absolute values (while keeping the ratio between voltage and frequency constant) that can still operate a heat pump water heater. This range is usually 75-100% of the nominal voltage/frequency. As the voltage decreases, the power of the heat pump decreases accordingly, so that heat pump can be turned into variable power load when VFD is controlling it.

It helps to start the heat pump at lower frequency (around 75% of rated), as it minimizes required starting surge-current power. Thus, there is a minimum possible voltage/frequency that starts the heat pump, which translates to a minimum starting power threshold (heat pump starting power). Once the heat pump started, the power required minimum power to run the system decreases, so there is a minimum power threshold to continue running the unit at the starting voltage/frequency (heat pump running power).

If the power available from the solar PV system is lower than threshold power (FIG. 1) required to start the heat pump water heater (required starting power), it is possible to use available solar power for an electric resisting heating element, which directly converts the electrical power into the thermal dissipated power and heats the water directly, in our system, this continues until there is enough solar power available to run the heat pump. Thus, we use this resistive heating element and power it from the solar PV when there is not enough power to start and run the heat pump-based water heater.

Three phase variable frequency drive (VFD) architecture, coupled with front end DC/DC converter (boost circuit) can be used for controlling both single phase heat pump-based water heater, when connected between two phases, and additional resistive element, when connected across the third phase and DC− of the setup as shown in FIG. 2.

The controller includes a microcontroller or microprocessor and firmware in memory configured to obtain solar voltage and current values from the solar PV input, as well as DC link voltage and current. It also obtains information from various temperature sensors from outside the controller, and/or from the hot water storage tank to which the heat pump and resistive heating elements are connected, and sensors may include water temperature, ambient air temperature, and resistive heating element temperature. The microprocessor uses those sensors and calculates control signals for operating the boost converter as well as the six power switches of the variable frequency motor drive (VFD) that controls the operation of heat pump and power dissipated over the resistive heating element.

Also, if single or three phase heat pump system is powered by solar power only, it's possible to use electrical energy from an energy storage such as a battery or ultracapacitors, to start the motor. In an embodiment, energy storage is connected in the DC link circuit, as shown on the FIG. 3. If solar power is not enough to start the heat pump system, it can charge battery or ultracapacitor connected in the DC link circuit (FIG. 3), which will be used to start the heat pump system when there is enough solar power available to run the heat pump system. That way the obstacle of not enough solar power to start the heat pump is overcome.

If an external AC power source is available, it's possible to use the AC source for starting the heat pump system, as shown in FIG. 4. AC source power is used just for starting the heat pump to overcome starting power surges that exceed running power, so once started, running the heat pump is maintained from solar power only. In some embodiments a single-phase heat pump system connects across two phases of VFD, which outputs required AC power for heat pump system operation, with the resistive heating element wired across the third phase and DC−, thus the third phase of the VFD operate as a DC/DC converter, managing resistive element power.

It's also possible to use three phase VFD architecture for running three phase heat pumps, in which case the resistive heating element may positioned in the DC link circuit, controlled by a DC-DC buck converter circuit as shown in FIG. 5.

Lastly, our proposed VFD architecture can run a single-phase heat pump if heat pump internal loads like the compressor motor, water pump and fan, are rewired as shown on the FIG. 6. In that scenario the resistive heating element is still in DC link circuit, while heat pump associated loads are individually controlled using relays, as shown.

Using the wiring arrangement of FIG. 6, and by controlling individual components of the heat pump system, we minimize start-up power requirement of the heat pump in general and attenuate start-up current overshoot by controlling the heat pump fan via a fan relay independently from the compressor and water pump on a separate compressor relay. Both fan relay, and compressor-water pump relay are controlled by the microcontroller that triggers those relays based on the thermostat temperature settings for water heater.

Thus, whenever compressor must start, compressor relay has to close, and the VFD drives the compressor's starting winding (connected across phases 1 and 2 of the VFD) independently from the compressor's main winding (connected across phases 1 and 3 of the VFD), which is also connected in parallel with the heat pump water heater's water pump. As a result, the VFD starts the entire heat pump system without usual extra start-up power being absorbed by the fan motor. The fan is started after the compressor is running as this is typically a lower-power motor with correspondingly lower starting-power surges.

In summary, there are two key options of using solar energy for heat pump water heaters.

1. Only solar energy is used for running the heat pump water heater and/or resistive element, where if available solar PV power is not sufficient to start the heat pump-based water heater, then it used for powering a resistive heating element, which is connected either at the output of the three phase VFD (FIGS. 2 and 4) or through a DC-DC converter (FIGS. 5 and 6). Also, if there is an excess power of solar PV system while running heat pump-based water heater, the excess power can be used for to simultaneously power the resistive heating element.
2. Solar energy is used in conjunction with AC utility energy, where AC energy is either used for starting the heat pump, or solar energy is used for offsetting the AC utility energy used for running the heat pump system, so that solar PV energy is always fully converted into thermal energy by heating the water via heat pump-based and resistive heating element-based water heaters.

Power of both heat pump and resistive heating element is variable in real time by adjusting VFD frequency and, where possible, voltage, or by using DC-DC converter in DC link circuit.

If daily solar PV energy was not enough for heating a water to desired temperature, an AC grid can be used \to top off the hot water to a minimum temperature setting, in which case AC grid is used as a back-up power.

Furthermore, in certain conditions, usually under very low ambient temperature, the Coefficient of Performance (COP) of the heat pump can decrease in a value lower than 1. In such scenario the controller can stop using the heat pump and use all available solar energy on the resistive heater to increase overall heating efficiency.

Lastly, water temperature sensors positioned in the water heater tank, as well as maximum hot water setting in the microcontroller indicate when the water heater should turn on and off. In a case there is excess of solar PV energy available, it's possible for the microcontroller to change temperature settings to store more thermal energy in the water tank, thus utilizing the water tank capacity to its maximum. The controller can distribute required consumed grid power between the heat pump and resistive elements by controlling the power draw from the solar panels, thus shaping up the power profile of the load and choosing how much power is consumed from the grid, and when grid power is used, and how much power is used from solar in real time.

The term aqueous as used herein means either water or a water-based solution such as an antifreeze solution. Antifreeze solutions may be of particular use in reversible heating-cooling systems for building air temperature management.

Combinations

The features herein described may be used in several combinations. Among combinations anticipated are:

A system designated A including a solar photovoltaic system; a DC/DC power converter connected to the solar photovoltaic system to extract maximum power from the solar photovoltaic system and power a DC bus; an electric heat pump-based heating device coupled to heat a thermal mass; a resistive heating element in the electric heat pump-based heating device coupled to heat the thermal mass;

sensors adapted to measure current, voltage, and temperature coupled to a microcontroller; a variable frequency (VFD) motor drive coupled to receive power from the DC bus and having at least a first phase output coupled to the electric heat pump-based heating device; and a resistive heating element connected to resistive power control apparatus selected from a pulse-width modulator and a DC-DC converter. The DC/DC power converter, the VFD, and the resistive power control apparatus are coupled to be controlled by the microcontroller. The microcontroller is configured by firmware to: monitor power available and if power available is less than a first threshold, operate the resistive power control apparatus to use power available in the resistive heating element; if power available is greater than the first threshold, use the VFD to use the power available to power the electric heat pump-based heating device at a frequency and an AC voltage increasing with power available, the frequency limited to a maximum frequency and the AC voltage limited to a maximum AC voltage; and if power available is greater than sufficient power to use the VFD to power the electric heat pump-based heating device at the maximum frequency and the maximum AC voltage, to operate the resistive power control apparatus to use that portion of power available greater than sufficient power to use the VFD to power the electric heat pump-based heating device at the maximum frequency and the maximum AC voltage to drive the resistive heating element.

A system designated AA including the system designated A where the thermal mass is aqueous.

A system designated AB including the system designated A or AA wherein the electric heat pump-based heating device comprises a mechanical heat pump having a motor.

A system designated ABA including the system designated AB where the VFD has at least two output phases coupled to the motor of the mechanical heat pump.

A system designated ABB including the system designated ABA where the motor of the is an alternating current (AC) induction motor and where the VFD has a first phase coupled to a run winding of the electric heat pump device and a second phase coupled to a starting winding of the electric heat pump device.

A system designated AC including the system designated A, AA, AB, ABA, or ABB where the resistive power control apparatus is a DC-DC converter.

A system designated AD including the system designated A, AA, AB, ABA, or ABB where the resistive power control apparatus is a phase output of the VFD operated as a pulse-width modulator.

A system designated AE including the system designated AA, AB, AC, AD, ABA, or ABB configured to provide domestic hot water.

A system designated AF including the system designated A, AA, AB, AC, AD, ABA, or ABB configured to heat a building.

A system designated AG including the system designated AF wherein the electric heat pump-based heating device is reversible.

A system designated AH including the system designated A, AA, AB, AC, AD, AE, AF, AG, ABA, or ABB further including a grid interface device adapted to provide power to the grid configured to transfer grid power to the DC bus.

A controller designated B includes a first output adapted to provide power to an electric heat pump-based water heater having an alternating current (AC) motor; a second output adapted for coupling to a resistive water heating element in the electric heat pump-based water heater; a multiphase variable frequency (VFD) motor drive coupled to provide power to the first output; an input adapted for connection to a solar photovoltaic power source, the second output coupled to receive power from a resistive power control apparatus selected from a pulse-width modulator and a DC-DC converter; and a DC/DC power converter configured for connection to a solar photovoltaic system. The DC/DC power converter is coupled to provide power to the VFD and to the resistive power control apparatus; and the DC/DC power converter, the VFD, and the resistive power control apparatus, are controlled by a microcontroller. The microcontroller contains firmware configured to: operate the DC-DC converter to extract maximum power from the input adapted for connection to a solar photovoltaic power source using a maximum-power-point-tracking (MPPT) method, determine power available from the input adapted for connection to a solar photovoltaic power source and if power available is less than a first threshold, operate the resistive power control apparatus to use power available in the resistive water heating element; if power available is greater than the first threshold, use the VFD to use the power available to power the electric heat pump-based water heater at a frequency and an AC voltage increasing with power available, the frequency limited to a maximum frequency and the AC voltage limited to a maximum AC voltage; and if power available is greater than sufficient power to use the VFD to power the electric heat pump-based water heater at the maximum frequency and the maximum AC voltage, to operate the resistive power control apparatus to use that portion of power available greater than sufficient power to use the VFD to power the electric heat pump-based water heater at the maximum frequency and the maximum AC voltage to drive the resistive water heating element.

A controller designated BA including the controller designated B, further including an AC grid power input; wherein, if there is enough available solar power to power a motor of the electric heat pump-based water heater coupled to the first output, power from the AC grid power input is used to overcome motor starting surges on the first output.

A controller designated BB including the controller designated B or BA, wherein the resistive power control apparatus is a pulse-width modulator, the VFD is a three-phase VFD, the first output is coupled to two phases of the VFD, and a third phase of the VFD serves as the pulse width modulator of the resistive power control apparatus.

A controller designated BC including the controller designated B or BA, wherein the VFD is a three-phase VFD with all three phases coupled to the first output and wherein a DC-DC converter is coupled to drive the second output.

A controller designated BCA including the controller designated BC, wherein the VFD has a first phase of the VFD to a first line of the first output and configured to drive a starting winding of a single-phase AC induction motor of the electric heat pump based water heater, a second phase of the VFD coupled to a second line of the first output and configured to be coupled to run winding of the single-phase AC induction motor, and a third phase of the VFD is coupled to a third line of the first output and is configured to be coupled to a common terminal of the single-phase AC induction motor.

A controller designated BD including the controller designated B, BA, BB, BC, or BCA, and further including an AC grid power input, the microcontroller being configured to start any AC electric motor of the electric heat pump-based water heater coupled to the first output on AC grid power and, once the AC electric motor has started, to run the AC electric motor of the electric heat-pump-based water heater on power from the photovoltaic power source.

A controller designated BE including the controller designated B, BA, BB, BC, BD, or BCA, wherein the microcontroller is configured to determine if available solar power is insufficient to heat water in the electric, heat pump-based, water heater, and water temperature in the electric heat pump-based water heater is below a threshold, to operate the electric, heat-pump-based, water heater on power drawn from the AC grid power input.

A controller designated BE including the controller designated B, BA, BB, BC, BD or BCA, wherein the microcontroller is configured to use the VFD to start the motor of the heat pump-based water heater at a first frequency and voltage level, and, when sufficient solar power is available, the microcontroller increases VFD frequency and voltage to use available solar power.

A controller designated BF including the controller designated B, BA, BB, BD, or BE, wherein voltages measured across the resistive water heating element are used to measure available solar power, and to determine when to start the motor of the heat pump-based water heater, and, when there is enough measured solar power to run the motor of the electric heat-pump-based water heater, to use energy from an electrical energy storage to overcome starting power surges of a motor of the electric heat pump-based water heater, and wherein further operation of the motor of the electric heat pump-based water heater uses energy from solar power.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A system comprising:
   a solar photovoltaic system;
   a DC/DC power converter connected to the solar photovoltaic system to extract maximum power from the solar photovoltaic system and power a DC bus;
   an electric heat pump-based heating device coupled to heat a thermal mass;
   a resistive heating element in the electric heat pump-based heating device coupled to heat the thermal mass;
   a variable frequency (VFD) motor drive coupled to receive power from the DC bus and having at least a first phase output coupled to the electric heat pump-based heating device;
   the resistive heating element connected to resistive power control apparatus selected from a pulse-width modulator and a DC-DC converter;
   wherein the DC/DC power converter, the VFD, and the resistive power control apparatus are coupled to be controlled by a microcontroller;
   sensors adapted to measure current, voltage, and temperature coupled to the microcontroller;
   wherein, the microcontroller is configured by firmware to:
   monitor solar power available and
      if solar power available is less than a first threshold, operate the resistive power control apparatus to use power available in the resistive heating element;
      if solar power available is greater than the first threshold, use the VFD to use the solar power available to power the electric heat pump-based heating device at a frequency and an AC voltage increasing with solar power available, the frequency limited to a maximum frequency and the AC voltage limited to a maximum AC voltage; and
      if solar power available is greater than sufficient power to use the VFD to power the electric heat pump-based heating device at the maximum frequency and the maximum AC voltage, to operate the resistive power control apparatus to use that portion of solar power available greater than sufficient power to use the VFD to power the electric heat pump-based heating device at the maximum frequency and the maximum AC voltage to drive the resistive heating element.

2. The system of claim 1 where the thermal mass is aqueous.

3. The system of claim 1 wherein the electric heat pump-based heating device comprises a mechanical heat pump having a motor; and where the VFD has at least two output phases coupled to the motor of the mechanical heat pump.

4. The system of claim 3 where the motor of the mechanical heat pump is an alternating current (AC) induction motor and where the VFD has a first phase coupled to a run winding of the electric heat pump device and a second phase coupled to a starting winding of the electric heat pump device.

5. The system of claim 1 where the resistive power control apparatus is a DC-DC converter.

6. The system of claim 1 where the resistive power control apparatus is a phase output of the VFD operated as a pulse-width modulator.

7. The system of claim 2 configured to provide domestic hot water.

8. The system of claim 1 configured to heat a building.

9. The system of claim 8 wherein the electric heat pump-based heating device is reversible.

10. The system of claim 1 further comprising a grid interface device adapted to provide excess power to a grid.

11. A controller comprising:
    a first output adapted to provide power to an electric heat pump-based water heater having an alternating current (AC) motor;
    a second output adapted for coupling to a resistive water heating element in the electric heat pump-based water heater;
    a multiphase variable frequency (VFD) motor drive coupled to provide power to the first output;
    an input adapted for connection to a solar photovoltaic power source;
    the second output coupled to receive power from a resistive power control apparatus selected from a pulse-width modulator and a DC-DC converter;
    a DC/DC power converter configured for connection to a solar photovoltaic system;
    wherein the DC/DC power converter is coupled to provide power to the VFD and to the resistive power control apparatus;
    wherein the DC/DC power converter, the VFD, and the resistive power control apparatus, are controlled by a microcontroller;
    wherein the microcontroller contains firmware configured to:

operate the DC-DC converter to extract maximum power from the input adapted for connection to a solar photovoltaic power source using a maximum-power-point-tracking (MPPT) method, determine solar power available from the input adapted for connection to a solar photovoltaic power source and if solar power available is less than a first threshold, operate the resistive power control apparatus to use solar power available in the resistive water heating element;

if solar power available is greater than the first threshold, use the VFD to use the solar power available to power the electric heat pump-based water heater at a frequency and an AC voltage increasing with solar power available, the frequency limited to a maximum frequency and the AC voltage limited to a maximum AC voltage; and if solar power available is greater than sufficient power to use the VFD to power the electric heat pump-based water heater at the maximum frequency and the maximum AC voltage, to operate the resistive power control apparatus to use that portion of solar power available greater than sufficient power to use the VFD to power the electric heat pump-based water heater at the maximum frequency and the maximum AC voltage to drive the resistive water heating element.

12. The controller of claim 11, further comprising an AC grid power input;

wherein, if there is enough solar power available to power a motor of the electric heat pump-based water heater coupled to the first output but insufficient solar power available to start the motor of the electric heat pump-based water heater, power from the AC grid power input is used to overcome motor starting surges on the first output but not for running the motor of the electric heat-pump-based water heater.

13. The controller of claim 11 the VFD is a three-phase VFD, the first output is coupled to two phases of the VFD, and a third phase of the VFD serves as a pulse width modulator of the resistive power control apparatus to modulate power on the second output.

14. The controller of claim 11 wherein the VFD is a three-phase VFD with all three phases coupled to the first output and wherein a DC-DC converter is coupled to drive the second output.

15. The controller of claim 14 wherein the VFD has a first phase coupled to a first line of the first output and configured to drive a starting winding of a single-phase AC induction motor of the electric heat pump based water heater, a second phase of the VFD coupled to a second line of the first output and configured to be coupled to run winding of the single-phase AC induction motor, and a third phase of the VFD coupled to a third line of the first output and configured to be coupled to a common terminal of the single-phase AC induction motor.

16. The controller of claim 11 further comprising an AC grid power input, the microcontroller being configured to start any AC electric motor of the electric heat pump-based water heater coupled to the first output on AC grid power and, once the AC electric motor has started, to run the AC electric motor of the electric heat-pump-based water heater on power from the photovoltaic power source.

17. The controller of claim 16 wherein the microcontroller is configured to determine if available solar power is insufficient to heat water in the electric, heat pump-based, water heater, and water temperature in the electric heat pump-based water heater is below a threshold, to operate the electric, heat-pump-based, water heater on power drawn from the AC grid power input.

18. The controller of claim 16, wherein the microcontroller is configured to use the VFD to start the motor of the heat pump-based water heater at a first frequency and voltage level, and when sufficient solar power is available, the microcontroller increases VFD frequency and voltage to use available solar power.

19. The controller of claim 11, wherein voltages measured across the resistive water heating element are used to measure available solar power, and to determine when to start the motor of the heat pump-based water heater, and, when there is enough measured solar power to run the motor of the electric heat-pump-based water heater, to use energy from an electrical energy storage to overcome starting power surges of a motor of the electric heat pump-based water heater, and wherein further operation of the motor of the electric heat pump-based water heater uses energy from solar power.

20. A system comprising:

a solar photovoltaic system;

a DC/DC power converter connected to the solar photovoltaic system to extract maximum power from the solar photovoltaic system and power a DC bus;

an electric heat pump-based heating device coupled to heat a thermal mass;

a resistive heating element in the electric heat pump-based heating device coupled to heat the thermal mass;

a variable frequency (VFD) motor drive coupled to receive power from the DC bus and having at least a first phase output coupled to the electric heat pump-based heating device;

the resistive heating element connected to resistive power control apparatus selected from a pulse-width modulator and a DC-DC converter;

wherein the DC/DC power converter, the VFD, and the resistive power control apparatus are coupled to be controlled by a microcontroller;

sensors adapted to measure current, voltage, and temperature coupled to the microcontroller;

wherein, the microcontroller is configured by firmware to monitor solar power available; and further comprising firmware configured to operate the resistive power control apparatus to use the soler power available in the resistive heating element, the firmware configured to operate the resistive power control apparatus being executed when the solar power available is less than a first threshold;

further comprising firmware configured to use the VFD to use the solar power available to use the VFD to use the solar power available to power the electric heat pump-based heating device at a frequency and an AC voltage increasing with power available, the frequency limited to a maximum frequency and the AC voltage limited to a maximum AC voltage, the firmware configured to use the solar power available to power the electric heat pump-based heating device being executed when the solar power available is greater than the first threshold; and further comprising firmware configured to use the VFD to use the solar power available to power the electric heat pump-based heating device at the maximum frequency and the maximum AC voltage and to operate the resistive power control apparatus to use that portion of solar power available unused by the VFD to power the electric heat-pump based heating device at maximum frequency and maximum AC voltage that is executed when the solar power available is greater than power required to use the VFD to power the electric heat pump-based heating device at maximum frequency and maximum AC voltage.

21. The system of claim 20 configured for operation without a grid connection and without a battery.

\* \* \* \* \*